United States Patent [19]

Ichida

[11] 3,868,107
[45] Feb. 25, 1975

[54] SIMULATED VIEWING APPARATUS
[76] Inventor: Taketoshi Ichida, 11, 3-chome Oogimachi, Chikusa-ku, Nagoya, Japan
[22] Filed: Feb. 26, 1973
[21] Appl. No.: 335,886

[30] Foreign Application Priority Data
Feb. 28, 1972 Japan.............................. 47-20415

[52] U.S. Cl................................. 272/18, 272/6
[51] Int. Cl............................................ A63g 31/16
[58] Field of Search............ 272/2, 6, 7, 16, 17, 18, 272/32; 104/53, 71, 83, 84, 85, 86

[56] References Cited
UNITED STATES PATENTS

| | | | |
|---|---|---|---|
| 836,614 | 11/1906 | Sutherland........................... | 272/32 |
| 895,176 | 8/1908 | Gaynor................................. | 272/2 |
| 981,672 | 1/1911 | Napp.................................... | 272/17 |
| 1,143,352 | 6/1915 | Boecker......................... | 272/32 UX |
| 1,485,839 | 3/1924 | Dye..................................... | 104/84 |
| 2,064,035 | 12/1936 | Rynearson........................... | 104/71 |
| 3,628,829 | 12/1971 | Heilig.......................... | 272/8 R UX |

Primary Examiner—Richard C. Pinkham
Assistant Examiner—R. T. Stouffer
Attorney, Agent, or Firm—Frank J. Jordan

[57] ABSTRACT

A simulated viewing apparatus includes a semispherical dome disposed over a circular pool. A viewing capsule is movable up and down within the dome between a position above the pool and a position submerged within the water in the pool. Apparatus is provided for producing a visual, acoustic, and tactile effect simulating real events of travel in air, on the water, and submerged within water to a passenger in the capsule as the latter is moved up and down between the aforementioned positions.

1 Claim, 2 Drawing Figures

SIMULATED VIEWING APPARATUS

BACKGROUND OF THE INVENTION

The present invention relates to a simulated panoramic viewing apparatus in which a viewing capsule is moved into a model space to produce for a passenger in the capsule an illusion as if he is placed in an actual situation.

In general, known types of viewing apparatus mainly move in the same horizontal plane or upwards or downwards from the horizontal plane.

That is, it is limited to apparatus such as a jet coaster, a motor-car, or a boat which moves in the same horizontal plane by means of wheels or flotation and otherwise or apparatus such as an airplane, cable car, or submarine which rotatingly moves at several meters elevation relative to ground level. These are vehicles mainly for play or recreation and for enjoying a dynamic sense of movement, and not for reproducing a simulated situation corresponding to a sense of movement as well as to experiencing perceptions in a visual sense, an acoustic sense and a tactile sense, as in the present invention.

An object of the present invention is to provide a viewing apparatus for allowing a person to sit in a seat and enjoy a simulated trip in air, on water and in water.

Another object of the present invention is to provide an apparatus for giving a person a higher grade atmosphere, feeling, or experience as if he were placed in the actual situation of moving to or through the above mentioned three types of space as well as by realistically reproducing effects of a visual sense, an acoustic sense and a tactile sense.

A feature of the present invention is to create an atmosphere similar to an actual situation and which can be changed corresponding to time and to the sense of the created situation.

Another feature of the present invention is to provide an apparatus which can not only be used for pleasure but also can be used in connection with various activities such as sports, education and experiments by an exchange or application of different reproduction devices.

Other feature and advantages of the invention will be apparent from the following description taken in connection with the accompanying drawings.

SUMMARY OF THE INVENTION

A simulated viewing apparatus includes a semi-spherical dome disposed over a circular pool. A tower is disposed at the center of the pool and a viewing capsule is movable up and down at a central portion of the dome between a position above the water in the pool and a position submerged within the water in the pool. Means are provided for producing a visual, acoustic, and tactile effect simulating real events to a viewer in the capsule as the latter is moved up and down.

DESCRIPTION OF THE PREFERRED EMBODIMENTS

Figure 1:
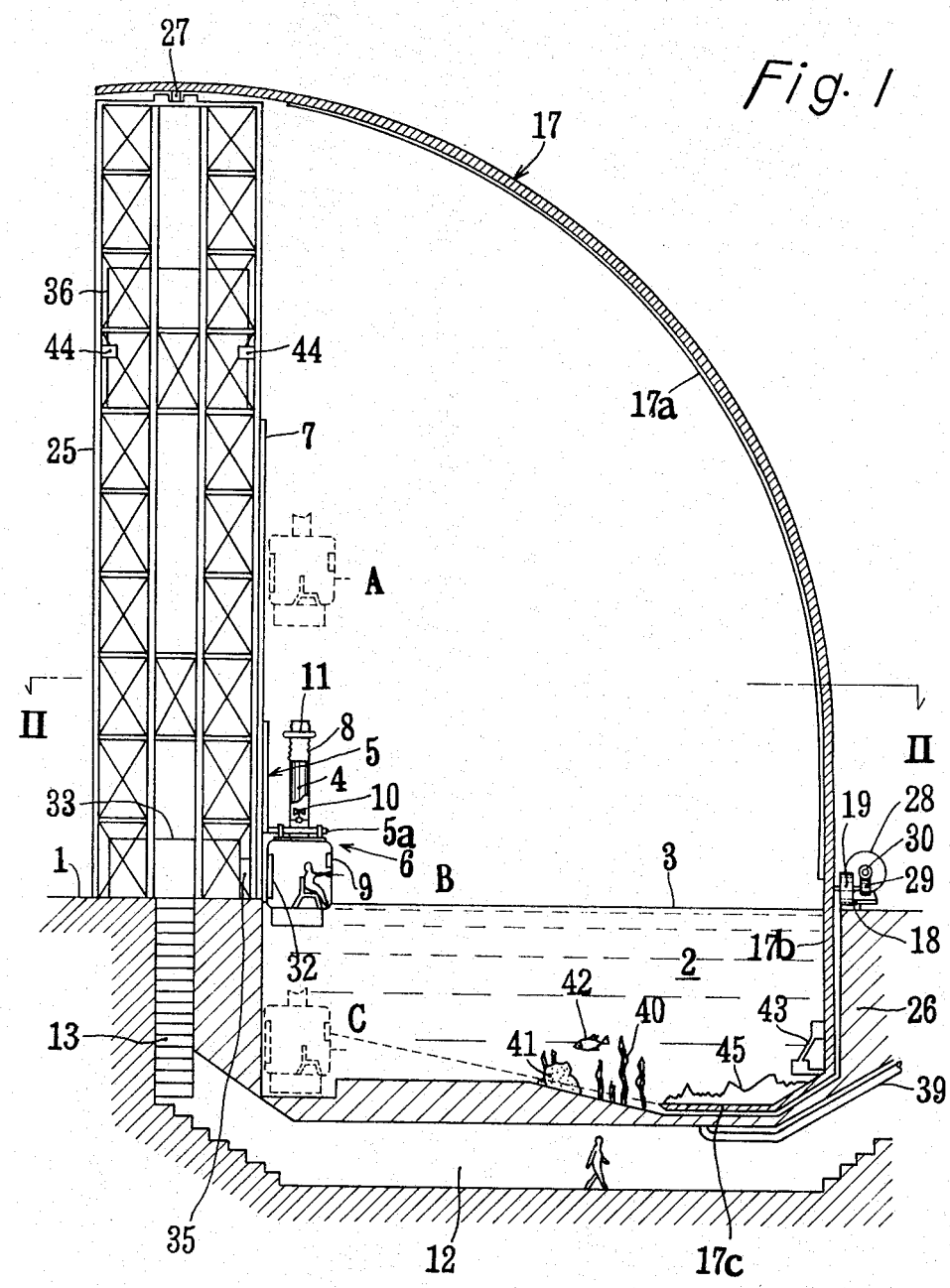
FIG. 1 is a semi diagrammatical and schematic sectional view taken along a central vertical sectional plane of a simulated viewing apparatus according to one embodiment of the invention.

The circumference of a pool 2 is constructed and defined by an annular vertical wall 26, and at the center of the annular pool 2 there is provided an island 1 which projects above the surface of the water 3. A suitable number of towers 25 are constructed on the island 1 by steel frames or reinforced concrete.

An approximately semi-spherical dome 17 is pivoted at the top of the tower 25 and is rotatable around a rotating axis 27 at the top. The bottom part of the dome 17 passes into the water at 17b along a vertical surface of the pool wall 26, and an inner flange part 17c at the bottom of the dome 17 is parallel to the bottom of the pool 2 to constitute or represent the bottom of the sea or the bottom of a body of water as hereinafter further described.

A suitable number of support wheels 19 guided by a rail or guide 18 annularly arranged along the upper edge of the pool wall 26 are provided at the circumference of the dome 17. A motor 28 driving a worm gear 30 is mounted at the circumference of the dome 17 to interlock or engage a worm gear 29 arranged coaxially to the support wheel 19. The worm gear 30 is arranged on the output shaft of the motor 28 so that at least one support wheel is driven by the motor drive for effecting slow rotating of the dome 17. The dome 17 is constructed by a framework of angle or pipe members which are in contact with pressed metallic sheets or with reinforced plastic molding sheets so as to prevent leakage or passage of light. A screen 17a is arranged on the inner whole surface of the dome.

In more than one vertical plane (4 in the illustrated embodiment) of the tower 25, there is arranged a rail or guide 7 extending upwards from the surface of the water in the pool 2, each guide 7 being provided with a viewing capsule 6 supported by a lift 5 freely movable up and down.

The lift may be a usual elevator which is connected to a cable wound around a drum arranged at the top of the tower and which moves up and down along the guide 7. The lift may also be connected to a piston disposed in a cylinder and operated with oil or connected by means of a pinion and rack arrangement. Also a safety device (not shown) is provided for preventing a drop or fall of the lift 5 as the latter moves up and down during operation.

The capsule 6 is pivotably movable about shaft 5a which projects horizontally from the lift 5 and the capsule is arranged to slant or to be movable at an incline of up to a maximum angle of 90° within the surface where the vehicle is moved up and down.

At the upper position of the capsule there are arranged vent pipes 4 provided with fans 10 for ventilation. The pipe 4, is connected to a flexible tube 8, and at other end of the flexible tube 8 there is arranged a float 11 so that the flexible tube extends up to the surface 3 of the water to prevent inundation even if the capsule is inclined while in the water.

The capsule 6 has a configuration in the form of a square column or cylinder, and is provided with a suitable number of windows 9 of reinforced glass or plastic plate hermetically inserted at the front surface.

At the inner side of the window 9 there is arranged a shutter ( not shown ) so that the outer view can not be seen through the window as previously when the apparatus according to the invention is not operating.

At both ends of the capsule 6 there is arranged a machine room 16 which is provided with acoustic equipment, vibration equipment and other equipment as hereinafter described.

Within the capsule 6 there is arranged air conditioning equipment ( not shown ), a speaker reproduction device for stereophonic sound especially for simulated sound and background music, speaker equipment for explanation, and communication equipment between the interior and the exterior of the capsule.

Figure 2:
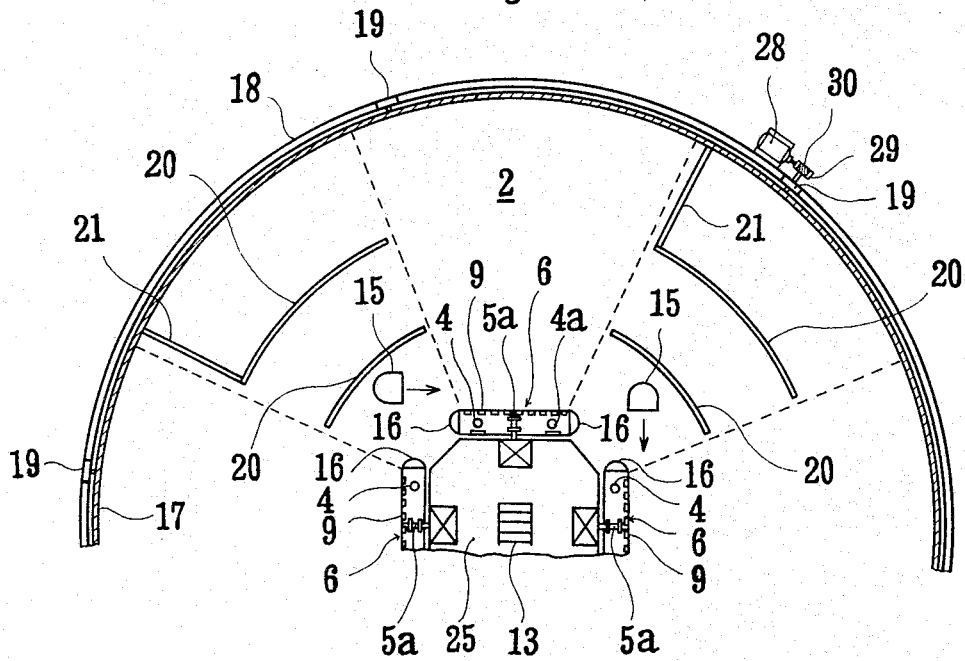
FIG. 2 is a schematic sectional view taken along the line I — I of FIG. 1.

Referring to FIG. 2, a suitable number of pumps 15 are arranged at the bottom of the pool 2 so as to circulate water in the pool. Also there are provided resistance plate 21 to prevent water flow and adjusting plates 20 to adjust water flow and these are arranged in suitable positions so that the water flow may be changed.

In the pool 2 there are arranged supply and exhaust pipes 39 which connect the bottom of the pool with an outer position so that fresh water and sea water can be freely exchanged.

At the bottom of the pool 2, seaweed 40, rocks 41, and simulated living things 42 are arranged to reproduce a simulated sea floor. At a location under sea level and at the bottom part 17b of the dome 17, there is provided a future model 43 on the sea floor of a city and also on the sea floor of a stock-farm which are arranged three-dimensionally.

Moreover in the flange part 17c of the dome, models of fishes, seaweed, rocks, broken ships and sea volcanos are arranged.

Besides these simulated living things, real and live fish from the sea can be used when sea water is introduced into the pool.

In the tower 25, there is arranged a control center 36 which controls the up and down motion of the lift 5, and the approximately 90° incline of the capsule. At the control center 36 there is arranged a cinema-projector 44 for reproducing natural sights such as a blue sky and clouds on the screen 17a of the dome 17, and morning and evening sights may be projected or stars can be filled in on the screen by means of the projection of stars.

Besides cinematographic means, the projection of slides or the use of photographic means can illustrate a natural sight or phenomenon on the inner surface of the dome.

In the island 1 is arranged a waiting-room 33 in which the view is blocked off by a device such as a shutter so that a person can not see the outer sights before riding on the vehicle. Under the bottom of the pool 2 there is arranged an underground passage 12 through which the island 1 connects with the outer area, and the passage is connected with the waiting-room 33 by a staircase 13, elevator or escalator.

At the elevation B, that is, at a position at sea level, a person can pass from the waiting-room to the capsule 6. The waiting-room 33 is connected with a hatch 32 or a spiral staircase by a passage whose view is blocked off 35 or by a large flexible tube.

The capsule 6 may be stopped exactly as positions A, B and C by a detecting device such as a limit switch arranged along the path of passage of the lift.

A person enters through the underground passage 12 and the staircase 13 (or elevator) into the waiting-room 33 for boarding. A person can not see the outer scene at all. When the capsule 6 arrives at the position B by remote control of the control center 36, the hatch 32 is opened and a passenger enters the capsule through the passage 35. The hatch 32 is hermetically closed after the capsule receives passengers to full seating capacity, and a ventilation fan 10 is operated whereby dirty air within the capsule 6 is exhausted through the ventilation tube.

While riding on the capsule, a passenger can not see the outer sights at all since the window 9 is covered with a blind. When the blind is released from the window 9, the lift 5 is driven by the remote control of the control center 36 and the capsule 6 hung or suspended on horizontal shaft 5a dives or moves to the bottom of the water. An arrangement for applying weight to the upper part of the capsule may be utilized corresponding to that necessary to make the diving easy. The pump 15 in the pool 2 is operated to circulate water within the pool, and at the same time the water flow rate is easily changed to slow or fast by the resistance plate 21 and the adjusting plate 20. The direction of the resistance plate 21 and the adjusting plate 20 may be controlled by the control center 36 for producing various changes if necessary.

When the diving of the capsule begins, simulated sounds previously programmed on recording tape, such as simulated sounds of a propeller screw, jet or the like is reproduced by a speaker in the capsule. By means of a small motor arranged in the machine room 16 of the capsule, vibration is applied to the capsule so that the capsule can simulate the operation of a submarine. Since bubbles, seaweed, fish, and wood flow near the window from the machine room 16 and at the same time the dome 17 is rotated slowly, a passenger feels as if he is travelling within the water.

When the capsule arrives at the bottom of the water or simulated sea ( designated by C ), a passenger can see a panorama of the sea bottom.

The dome 17 is rotated in the same direction or in an opposite direction against the water flow so that relative variation of speed of the capsule 6 makes a passenger feel that he is travelling slow or fast at the bottom of the sea. Variable scenery of the future city and stock farm at the bottom of the simulated sea which is formed three-dimensionally in the water at the parts 17b, 17c of the dome 17 and simulated sound or narration in the water which is synchronously recorded with development of the panorama and is transmitted to the capsule with stereophonic effect can improve the effect in an acoustic sense and visual sense.

When the panorama at the sea bottom ends upon completion of one rotation of the dome 17, the capsule 6 again comes up or returns to the position B by means of the lift 5.

Water flow and floating of wood and seaweed provide an effect making one feel as if he is positioned on the sea. Regarding the effect making one feel as if he is positioned in the air, sometimes smoke or dry ice is exhausted from the machine room 16 of the capsule 6 out of the window to produce a cloud, water is scattered at the window 9 by a sprinkler to produce rain, or water is sprayed like fog. During this step the water pump 15 may be stopped.

The capsule 6 moves up along guide 7.

In such reproduction by projection, the dome 17 may be in a stationary state. In the case of utilizing a photographic method, the dome 17 is slowly rotated and variations with respect to time and location are represented. When simulated travel in air is over, the capsule 6 again moves down to the position B, and the passenger leaves the capsule. A series of productions which begin in water and end in air by means of sound and the panoramic view make a passenger feel as if he is placed in the actual situation.

Each capsule at the periphery of the tower may be rotatable around the tower. Moreover the iron frame elevator tower itself may be rotatable moving the capsule up and down, and in this case at the lowering or diving of the capsule, the water is not divided straight so that a whirlpool or bubble effect is produced and appears at the window to decrease the effect of the diving state. Water may be projected by an illumination ray with suitable colors corresponding to the scene or it may be dyed by a coloring agent.

Summarizing the above, the present invention reproduces and simulates three-dimensional space by means of sound, light, projection or panoramic scene, and displacement of such space, whereby a person feels a sense of being placed in the situation. The aforementioned effects can not be produced by conventional viewing apparatus.

Besides a mere viewing apparatus, the present invention has many other applications such as providing for the inspection of situations involving fish and water flow, inspection of experimental operation of machines in water as regards oceanography, experiments involving water flow at the bottom of the sea and the influence as regards construction in the sea with variations in topography, water shows, coaching of swimming and water skiing, training of divers, and applications for pleasure comprising light ray guns, simulated torpedoes in the capsule, and targets such as animal monsters provided on the screen, in the water or at the bottom of sea.

What I claim is:

1. A simulated viewing apparatus comprising means defining a circular pool, said pool containing water therein, a tower arranged at the center of said pool, a semi-spherical dome disposed over said circular pool, annular guide means supporting said dome over said pool, supporting wheels mounted on the exterior of said dome and rotatable in said annular guide means, motor means operatively connected to at least one of said supporting wheels for driving the latter to thereby effect rotation of said dome relative to said pool, a lift means movable vertically along said tower, a horizontal shaft mounted on said lift means, a capsule, means for suspending said capsule from said horizontal shaft, supply and exhaust pipe means between the interior and exterior of said capsule, said supply and exhaust pipe means having a flexible tube portion, means for maintaining an upper portion of said supply and exhaust pipe means above the surface of the water is said pool, said dome having means thereon below the level of the water in the pool providing a three-dimensional effect and means above the level of the water in the pool providing a cinematographic panorama effect, pump means for circulating water in said pool, and movable resistant and adjusting plate means for effecting changes in the water flow in said pool, whereby real events are simulated to a viewer in the capsule as the latter is moved up and down to positions above and below the surface of the water in said pool.

* * * * *